United States Patent
Urisu

(10) Patent No.: US 8,339,522 B2
(45) Date of Patent: Dec. 25, 2012

(54) LIQUID CRYSTAL PANEL, PLASMA DISPLAY PANEL, AND WIDE-SCREEN LIQUID CRYSTAL TELEVISION

(75) Inventor: Takayoshi Urisu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1499 days.

(21) Appl. No.: 11/901,415

(22) Filed: Sep. 17, 2007

(65) Prior Publication Data

US 2008/0068517 A1 Mar. 20, 2008

(30) Foreign Application Priority Data

Sep. 19, 2006 (JP) ................................. 2006-252691

(51) Int. Cl.
*H04N 3/14* (2006.01)

(52) U.S. Cl. ........................ 348/790; 345/211; 345/204

(58) Field of Classification Search ................... 348/790, 348/797, 730; 345/211, 204; 315/169.1–169.4
See application file for complete search history.

(56) References Cited

U.S. PATENT DOCUMENTS

| | | | |
|---|---|---|---|
| 6,911,785 B2 * | 6/2005 | Yu et al. | 315/169.4 |
| 7,046,310 B2 * | 5/2006 | Lee | 348/836 |
| 2003/0011324 A1 * | 1/2003 | Lee | 315/291 |
| 2003/0011736 A1 * | 1/2003 | Ha et al. | 349/149 |
| 2004/0189628 A1 * | 9/2004 | Chun et al. | 345/211 |
| 2005/0007500 A1 * | 1/2005 | Lin et al. | 348/790 |
| 2005/0206801 A1 * | 9/2005 | Miura | 349/58 |
| 2006/0002063 A1 * | 1/2006 | Nishida | 361/681 |
| 2006/0197459 A1 * | 9/2006 | Tsai | 315/169.2 |
| 2007/0291180 A1 * | 12/2007 | Takatori | 348/726 |

FOREIGN PATENT DOCUMENTS

| | | |
|---|---|---|
| DE | 20 2005 006180 U | 6/2005 |
| EP | 1577894 A | 9/2005 |
| JP | 2003-061009 | 2/2003 |
| JP | 2003-110965 | 4/2003 |
| JP | 2006-129167 | 5/2006 |

OTHER PUBLICATIONS

The extended European Search Report dated Dec. 7, 2011.

* cited by examiner

*Primary Examiner* — Vivek Srivastava
*Assistant Examiner* — Aklil Tesfaye
(74) *Attorney, Agent, or Firm* — Yokoi & Co., U.S.A., Inc.; Toshiyuki Yokoi

(57) ABSTRACT

There is provided a liquid crystal television and a plasma television that can adapt to various destinations and are resistant to noise in view of the difference of circuit configurations between a liquid crystal television and a plasma television. A video signal processing circuit is formed on a digital board, an input and output circuit is formed on a jack board, an audio signal processing circuit and a power supply circuit are formed on an analog board, and a rectifier circuit and an inverter circuit are formed on an inverter board. Further, on the back of the LCD, the inverter board is disposed in a vertically oriented shape in the left, the analog board is disposed in the lower center, the digital board is disposed in the upper center adjacent to the analog board, and the jack board is disposed in the upper right.

8 Claims, 7 Drawing Sheets

LIQUID CRYSTAL PANEL, PLASMA DISPLAY PANEL, AND WIDE-SCREEN LIQUID CRYSTAL TELEVISION

CROSS-REFERENCES TO RELATED APPLICATIONS

The present application is related to the Japanese Patent Application No. 2006-252691, filed Sep. 19, 2006, the entire disclosure of which is expressly incorporated by reference herein.

BACKGROUND OF THE INVENTION (1) Field of the Invention

The present invention relates to a liquid crystal panel, a plasma display panel, and a wide-screen liquid crystal television.

(2) Description of the Related Art

In recent years, panel-type televisions such as liquid crystal televisions and plasma televisions have become remarkably widespread. While such a liquid crystal television and a plasma television have common functions in a video signal processing function, an audio signal processing function, a power supply circuit, and an input and output circuit, both types of televisions are manufactured based on their specific designs. This is because both types of televisions adopt their respective optimum circuit components and layouts thereof However, this design method increases design man-hours, and therefore prevents an improvement in design efficiency. As a matter of course, in each panel-type television, products of similar sizes such as 26 inches and 27 inches have commonality of boards and components.

The following are known techniques for providing commonality of boards and components. Japanese Unexamined Patent Application Publication No. 2006-129167 describes a technique of using an AV circuit board in common between a digital circuit board capable of receiving a charging broadcast and a digital circuit board incapable of receiving a charging broadcast. Japanese Unexamined Patent Application Publication No. 2003-110965 describes a technique of providing commonality of boards by forming mounting holes respectively for tuners of different terminal arrangements and connecting the corresponding mounting holes. Japanese Unexamined Patent Application Publication No. 2003-61009 describes a technique in which circuit components in common between a digital television and a digital television set-top box are formed on a first board, circuit components specific to each device are formed on a second board, and connections are made by wiring.

Conventionally, each panel-type television has commonality of boards and components; however, there is no commonality of board structures between the liquid crystal television and the plasma television. This is due to the following reasons.

First, there exist circuits that are necessary to either one of the liquid crystal television and the plasma television but unnecessary to the other one, which makes the design commonality difficult. For example, the liquid crystal television requires an inverter circuit and its dedicated power supply, whereas the plasma television does not require an inverter circuit.

Further, for commonality of board structures, problems with destinations and noise also exist. Nowadays, televisions are shipped to multiple countries (e.g., Japan, Europe, and US), requiring major design changes to conform to the broadcast systems of these countries. While a digital processing circuit is resistant to noise, a circuit for transmitting an analog input and output signal and the like is susceptible to noise and needs to be laid out apart from an inverter circuit and a power supply circuit which are likely to be noise sources.

BRIEF SUMMARY OF THE INVENTION

The present invention discloses a liquid crystal panel, a plasma display panel, and a liquid crystal television that can adapt to various destinations in view of the difference of circuit configurations between a liquid crystal television and a plasma television and are resistant to noise.

One aspect of the present invention provides a liquid crystal panel in which there are formed, on boards, a rectifier circuit that rectifies an input Alternative Current (AC) voltage to generate a Direct Current (DC) voltage; a power supply circuit that is supplied with a DC voltage from the rectifier circuit and generates various voltages; an analog circuit that performs analog processing on an input video signal and an input audio signal; a digital circuit that performs digital processing on an input video signal; an input and output circuit having an input and output terminal for inputting and outputting audio and video, connected to an external device; and an inverter circuit that is supplied with a DC voltage from the rectifier circuit and supplies an AC voltage to a backlight of the liquid crystal panel, the boards being disposed on a back of the liquid crystal panel, the liquid crystal panel, comprising: a first board on which the digital circuit is formed; a second board on which the input and output circuit is formed; a third board on which the analog circuit and the power supply circuit are formed; and a fourth board on which the rectifier circuit is formed; the first to fourth boards are identical to respective boards used in a plasma display panel, the fourth board is disposed in the lower end of one of a left side or the right side of an inverter board on which the inverter circuit is formed is disposed in a vertically oriented position above the rectifier circuit, the third board is disposed in the lower center and the first board is disposed in the upper center adjacent to the third board while maintaining a position relationship between the third board and the first board when disposed on the back of the plasma display panel, and the second board is disposed on a side interposing the first board between the fourth board and the second board.

With this structure, the first board, the second board, the third board, and the fourth board which are also used in the plasma display panel are disposed on the back of the liquid crystal panel. The fourth board and the inverter board are disposed in a vertically oriented shape either in the left or the right of the back of the liquid crystal panel, in which the fourth board is located on the lower side.

Since the first to fourth boards each are separate boards and therefore can be designed independently, adaptation to a different video signal system can be achieved by redesigning only the first board. The first board and the third board are disposed such that the relative position relationship therebetween is substantially the same as when disposed on the back of the plasma display panel. That is, since the plasma display panel and the liquid crystal panel can use the same boards and substantially the same relative position relationship, it is possible to reduce assembly work by unitizing the first board and the third board beforehand.

The invention thus constructed can provide the liquid crystal panel that has a board structure in common with the plasma display panel to eliminate product dependence, can be easily delivered in a short time for various destinations of different broadcast systems, and is resistant to noise. This enhances development efficiency and leads to cost reduction.

An optional aspect of the present invention provides the liquid crystal panel, wherein the fourth board and the inverter board are formed on the same board. According to the invention thus constructed, the rectifier circuit and the inverter circuit are formed on one board, which reduces assembly process and leads to cost reduction.

Another aspect of the present invention provides a plasma display panel in which there are formed, on boards, a rectifier circuit that rectifies an input Alternative Current (AC) voltage to generate a Direct Current (DC) voltage; a power supply circuit that is supplied with a DC voltage from the rectifier circuit and generates various voltages; an analog circuit that performs analog processing on an input video signal and an input audio signal; a digital circuit that performs digital processing on an input video signal; and an input and output circuit having an input and output terminal for inputting and outputting audio and video, connected to an external device, the boards being disposed on the back of the plasma display panel, the plasma display panel, comprising: a first board on which the digital circuit is formed; a second board on which the input and output circuit is formed; a third board on which the analog circuit and the power supply circuit are formed; and a fourth board on which the rectifier circuit is formed; the first to fourth boards are identical to respective boards used in a liquid crystal panel, the first board and the third board are disposed next to each other in the lower center while maintaining a position relationship between the first board and the third board when disposed on the back of the plasma display panel, the second board is disposed on one of the left side and the right side of the first board so as not to be adjacent to the third board, and the fourth board is disposed on one of the left side or the right side of the first board and the third board.

With this structure, the first board, the second board, the third board, and the fourth board which are also used in the liquid crystal panel are disposed on the back of the plasma display panel. Since the first to fourth boards each are separate boards and therefore can be designed independently, adaptation to a different video signal system can be achieved by redesigning only the first board. The first board and the third board are disposed such that the relative position relationship therebetween is substantially the same as when disposed on the back of the liquid crystal panel. That is, since the liquid crystal panel and the plasma display panel can use the same boards and substantially the same relative position relationship, it is possible to reduce assembly work by unitizing the first board and the third board beforehand.

The invention thus constructed can provide the plasma display panel that has a board structure in common with the liquid crystal panel to eliminate product dependence, can be easily delivered in a short time for various destinations of different broadcast systems, and is resistant to noise. This enhances development efficiency and leads to cost reduction.

Another optional aspect of the present invention provides the plasma display panel, wherein the first board and the third board are disposed side by side while maintaining a relative position relationship between the first board and the third board when disposed on the back of the liquid crystal panel. This enables various layouts in accordance with the space of the back of the plasma display panel.

Another optional aspect of the present invention provides the plasma display panel, wherein the rectifier circuit is provided with a line filter in a preceding stage. This can reduce common mode noise and differential mode noise caused by noise from a circuit connected to an AC power line, radiation noise picked up by the AC power line, noise caused by a problem with the quality of the AC power line, and the like, thus making it possible to protect a circuit connected to the rectifier circuit from noise and improve the quality of a power supply voltage outputted from the rectifier circuit.

Another aspect of the present invention provides a wide-screen liquid crystal television with at least 20-inch screen, in which there are formed, on boards, a tuner that receives a digital broadcast and outputs a digital video signal; an High-Definition Multimedia Interface (HDMI) terminal through which a digital audio and video signal is input and output; a rectifier circuit that rectifies an Alternative Current (AC) voltage inputted via an AC power cable to generate a Direct Current (DC) voltage; a power supply circuit that is supplied with a DC voltage from the rectifier circuit and generates various voltages; an analog circuit that performs analog processing on an input video signal and an input audio signal; a digital circuit that performs digital processing on a video signal input from one of the tuner and the HDMI terminal; an Low Voltage Differential Signaling (LVDS) terminal for outputting a liquid crystal panel driving signal for driving a liquid crystal panel via an LVDS cable from the digital circuit; an input and output circuit having an input and output terminal for inputting and outputting audio and video, connected to an external device; and an inverter circuit that is supplied with a DC voltage from the rectifier circuit and supplies an AC voltage to a backlight of the liquid crystal panel, the wide-screen liquid crystal television, including the liquid crystal panel that displays video on a screen in accordance with the panel driving signal and a cabinet that exposes the screen of the liquid crystal panel while housing the boards and the liquid crystal panel, with the boards disposed on the back of the liquid crystal panel, the wide-screen liquid crystal television, comprising: a first board on which the tuner, the HDMI terminal, and the LVDS terminal are disposed and the digital circuit is formed; a second board on which the input and output circuit is formed; a third board on which the analog circuit and the power supply circuit are formed; and a fourth board on which the rectifier circuit and the inverter circuit are formed; the first board, the second board, and the third board are identical to respective boards used in a plasma display panel, the fourth board is disposed in a vertically oriented position in the left, the third board is disposed in the lower center and the first board is disposed in the upper center adjacent to the third board while maintaining a position relationship between the third board and the first board when disposed on the back of the plasma display panel, the second board is disposed in the right, interposing the first board between the fourth board and the second board, and the cabinet is formed such that a center portion in a lateral direction projects backward, a terminal of the tuner and the HDMI terminal are exposed rightward from a right-side step portion formed by the projection, the input and output terminal is exposed in the upper right of the back of the cabinet, and the AC power cable is extended out from the lower left of the back of the cabinet.

It is needless to say that the same effect as the foregoing can be attained in this specific structure.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
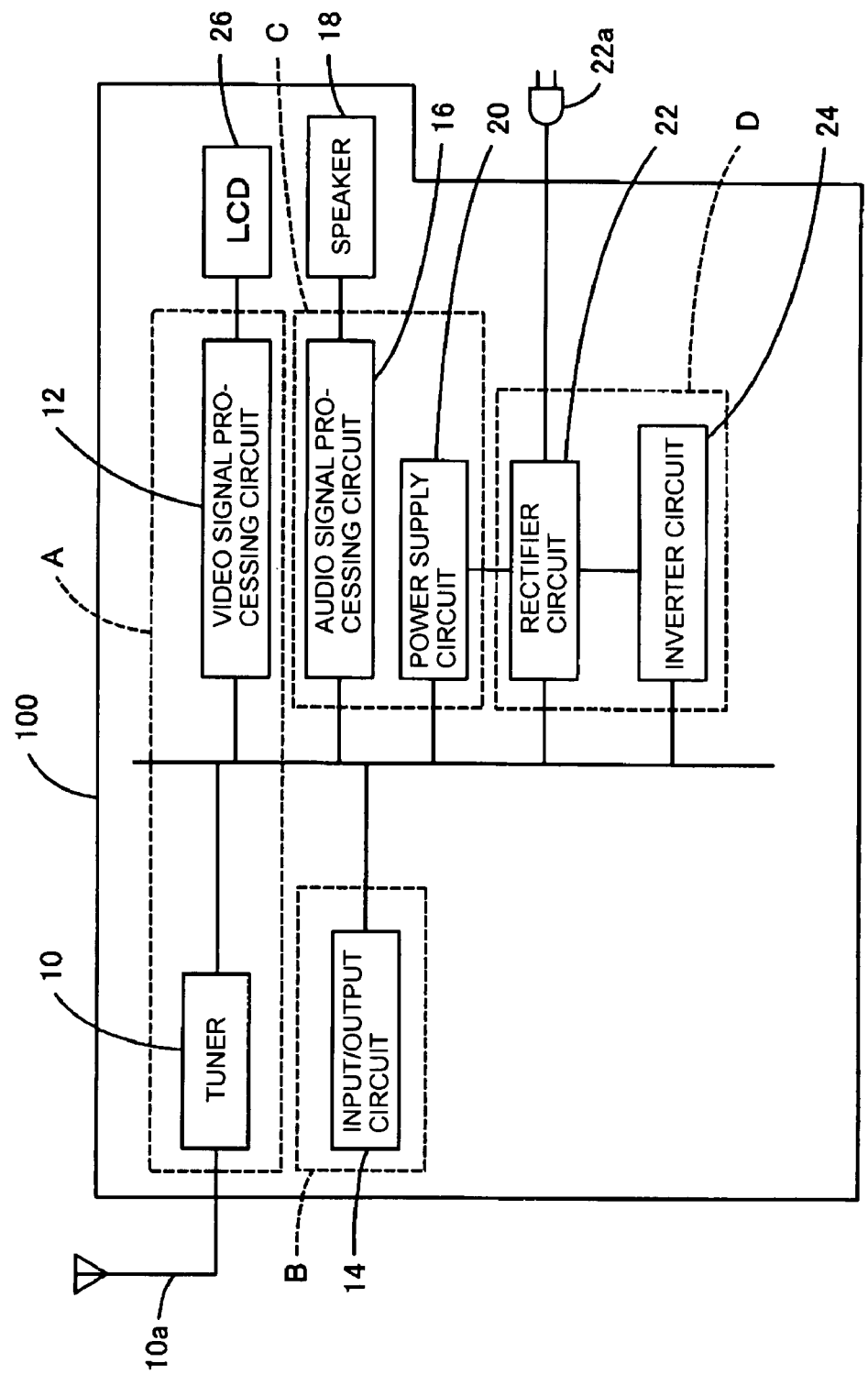
FIG. 1 is an exemplarily illustration of a block diagram showing a schematic configuration of a liquid crystal television according to an embodiment of the present invention.

Hereinafter, an embodiment of the present invention will be described in the following order.
(1) Configuration of Liquid Crystal Television
(2) Configuration of Plasma Television
(3) Board Layout of Liquid Crystal Television
(4) Board Layout of Plasma Television
(5) Summary (1) Configuration of Liquid Crystal Television FIG. 1 is a block diagram showing a schematic configuration of a liquid crystal television 100 according to an embodiment of the invention. The invention is preferably applied to a wide-screen liquid crystal television with a 20-inch or larger screen to provide commonality of boards with a plasma television. In FIG. 1, the liquid crystal television 100 is configured with a tuner 10, a video signal processing circuit 12, an input and output circuit 14, an audio signal processing circuit 16, a speaker 18, a power supply circuit 20, a rectifier circuit 22, an inverter circuit 24, and a liquid crystal display (LCD) 26.

The tuner 10 extracts a television broadcast signal of a selected channel from among television broadcast signals received via an antenna 10*a* and outputs it. Television broadcast signals to be received may be analog or digital broadcast signals. A received analog television broadcast signal is converted into a digital signal by the tuner 10 or the video signal processing circuit 12 described later.

The input and output circuit 14 is provided with terminals used for external input and external output or external input and output. More specifically, the input and output circuit 14 is provided with a terminal through which an analog composite signal is inputted and an HDMI (a registered trademark of HDMI Licensing, LLC) terminal 12*a* through which a digital audio and video signal can be inputted and outputted. As a matter of course, the input and output circuit 14 may be provided with a terminal through which a component signal or an S-video signal is inputted, an S/PDIF terminal, and the like. The input and output circuit 14 supplies to the video signal processing circuit 12 an audio and video signal inputted from the outside. Further, the input and output circuit 14 is supplied with a video signal and an audio signal from the video signal processing circuit 12 and outputs them to an external device via a cable connected to a terminal, for external output, of the input and output circuit 14.

The video signal processing circuit 12 is a one-chip IC that performs digital processing, and is configured with an A/D converter, a video decoder (V/D), a scaler, and a timing controller (Tcont). The A/D converter converts an analog audio and video signal inputted from the input and output circuit 14 into a digital audio and video signal. The V/D separates a video signal and an audio signal from the digital audio and video signal, outputs the separated audio signal to the audio signal processing circuit, and demodulates the separated video signal into three primary color (RGB) signals. Further, the video decoder 16*b* performs, on the RGB video signals, image quality adjustment such as color strength adjustment, contrast adjustment, TINT adjustment, brightness adjustment, color adjustment such as skin color correction, black-and-white expansion adjustment, delay adjustment, sharpness adjustment, gamma correction, and noise reduction, and outputs the adjusted signal to the scaler. The scaler converts successive interlaced video signals into progressive video signals, performs scaling so as to match the input digital video signal with the number of pixels (aspect ratio, m:n) on the screen of the LCD 26, generates image data for one screen to be displayed on the LCD 26, and outputs the generated image data to the Tcont. The Tcont outputs a panel driving signal based on the input image data, and drives each pixel arranged on the LCD 26 to display an image based on the image data on the screen of the LCD 26.

Upon receiving a digital audio signal, the audio signal processing circuit 16 converts, at a predetermined D/A converter, the digital audio signal into an analog audio signal, and performs analog processing on the analog audio signal, which is amplified at an amplifier (not shown) and outputted to the speaker 18 for audio output.

The rectifier circuit 22 receives a power supply voltage (AC) via an AC power cable 22*a* from an external power supply (e.g., a commercial power supply), converts the power supply voltage into a predetermined DC voltage, and supplies the DC voltage to the inverter circuit 24 and the power supply circuit 20.

The power supply circuit 20 supplies the DC voltage supplied from the rectifier circuit 22 to each circuit other than the inverter circuit 24.

The inverter circuit 24 converts the DC voltage supplied from the rectifier circuit 22 into a high-frequency AC voltage, and supplies the AC voltage as a drive signal to a backlight of the LCD 26 so as to light the backlight.

(2) Configuration of Plasma Television

Figure 2:
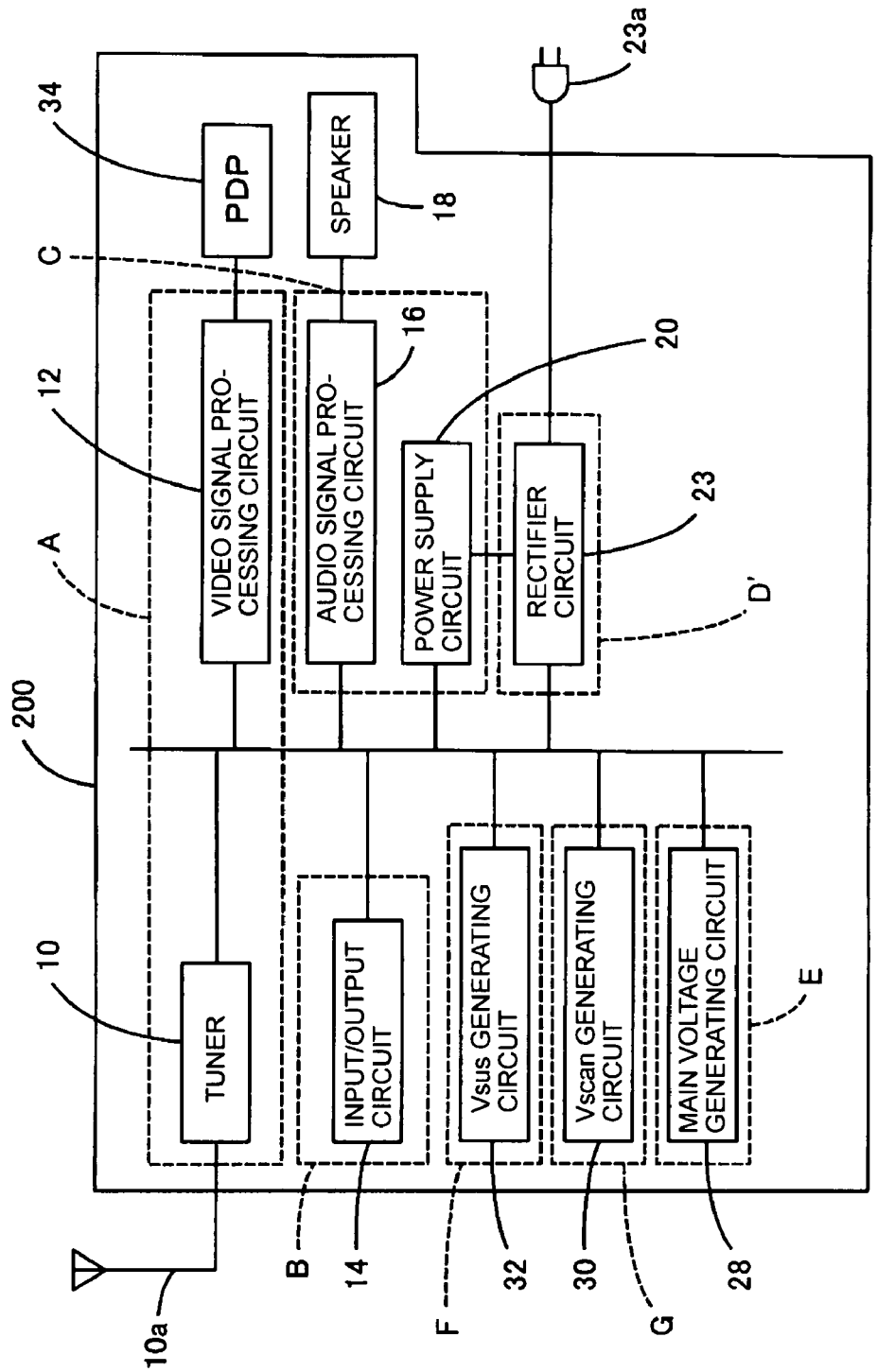
FIG. 2 is an exemplarily illustration of a block diagram showing a schematic configuration of a plasma television according to this embodiment.

FIG. 2 is a block diagram showing a schematic configuration of a plasma television 200 according to this embodiment. In FIG. 2, the plasma television 200 is configured with the tuner 10, the video signal processing circuit 12, an input and output circuit 14, the audio signal processing circuit 16, the speaker 18, the power supply circuit 20, a rectifier circuit 23, a plasma display panel (PDP) 34, a sustain voltage generating circuit 32, a scan voltage generating circuit 30, and a main voltage generating circuit 28.

The configurations of the tuner 10, the video signal processing circuit 12, the input and output circuit 14, and the audio signal processing circuit 16 are the same as those of the liquid crystal television 100, and their descriptions are omitted.

The rectifier circuit 23 receives a power supply voltage (AC) via an AC power cable 23a from an external power supply (e.g., a commercial power supply), converts the power supply voltage into a predetermined DC voltage, and supplies the DC voltage to the power supply circuit 20 and the main voltage generating circuit 28.

The power supply circuit 20 supplies the DC voltage supplied from the rectifier circuit 23 to each circuit other than the main voltage generating circuit 28, the scan voltage generating circuit 30, and the sustain voltage generating circuit 32.

The main voltage generating circuit 28 generates a voltage for generating a sustain voltage and a scan voltage from the DC voltage supplied from the rectifier circuit 23, and supplies the sustain voltage and the scan voltage to the sustain voltage generating circuit 32 and the scan voltage generating circuit 30 respectively.

The sustain voltage generating circuit 32 and the scan voltage generating circuit 30 generate a sustain voltage Vsus and a scan voltage Vscan respectively, which are respectively supplied to sustain electrodes and scan electrodes in multiple cells of the PDP 34. The PDP 34 according to this embodiment is a surface discharge type in which a pulse voltage is applied between a scan electrode and a sustain electrode, thereby causing a discharge in the direction of the display surface of the PDP 34.

(3) Board Layout of Liquid Crystal Television

Figure 3:
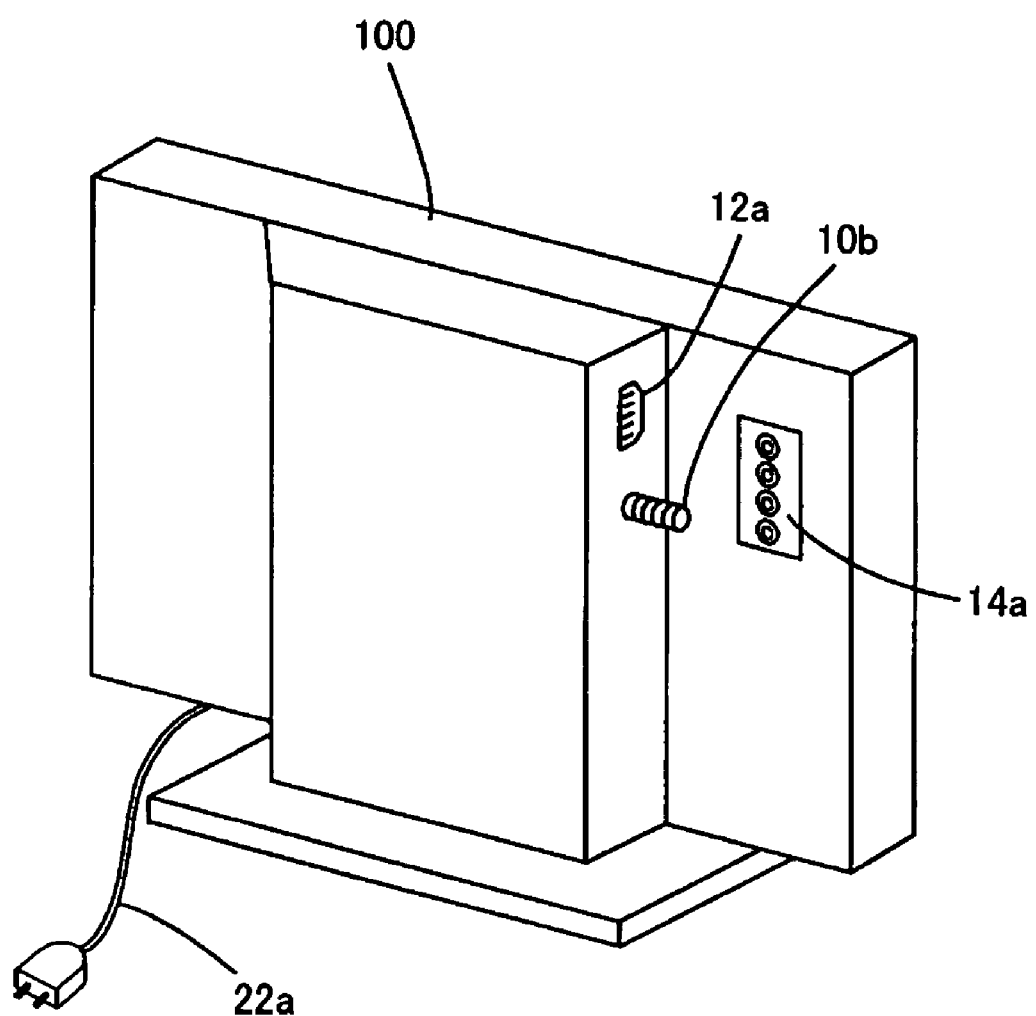
FIG. 3 is an exemplarily illustration of a perspective rear view of the liquid crystal television.
Figure 5:
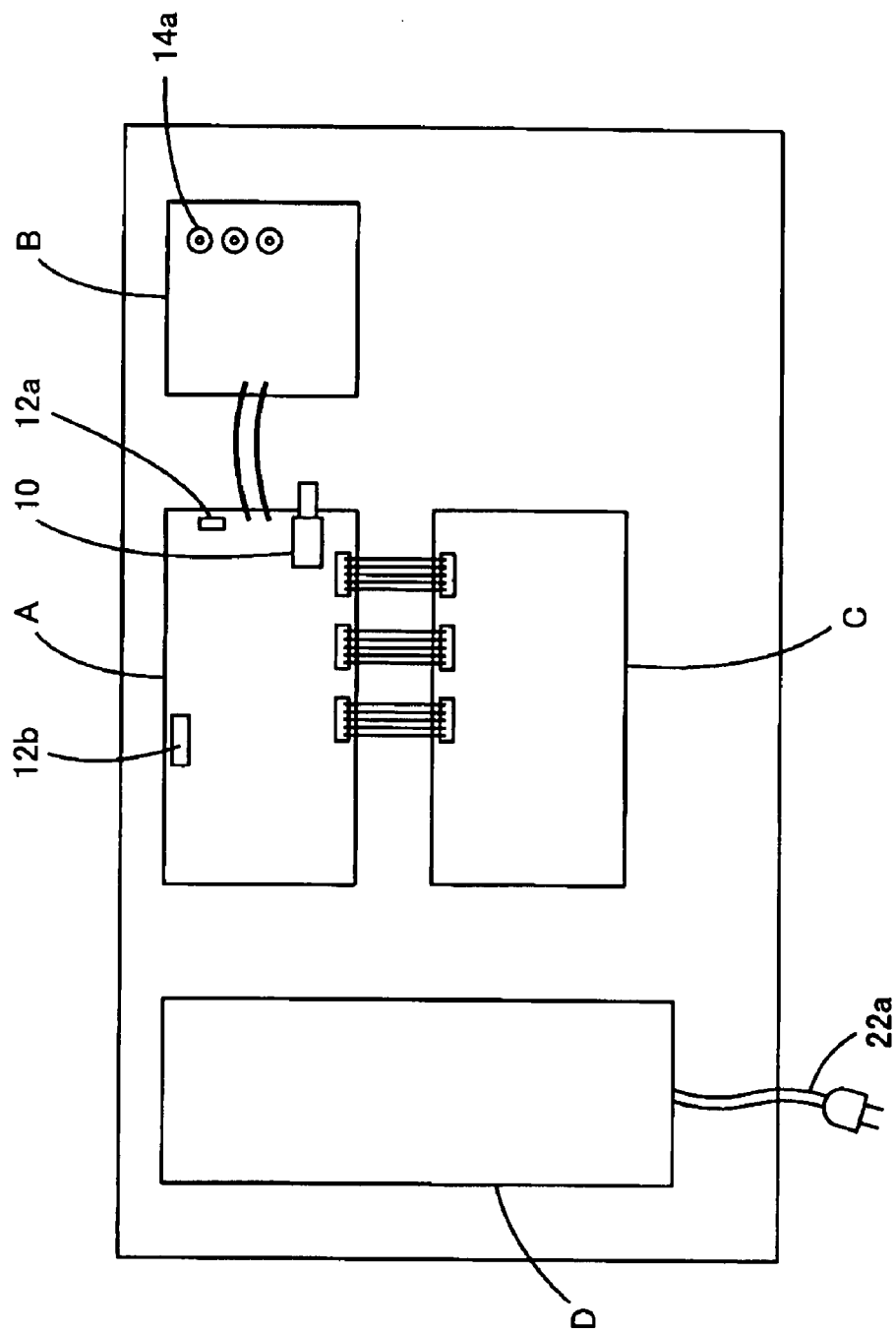
FIG. 5 is an exemplarily illustration of a schematic view showing board layout inside the back of the liquid crystal television.

Hereinafter, the board layout of the liquid crystal television 100 will be described with reference to FIGS. 3 and 5. FIG. 3 is a perspective rear view of the liquid crystal television 100. FIG. 5 is a schematic view showing the board layout inside the back of the liquid crystal television 100.

In FIG. 5, the outer frame indicates the outline of the back of the LCD 26 inside the liquid crystal television 100. There are disposed, on the back of the LCD 26, a digital board A (first board), a jack board B (second board), an analog board C (third board), and an inverter board D (fourth board). Hereinafter, the position relationship among the boards, and the circuits mounted on the boards will be described.

The digital board A is disposed in the upper center of the back of the LCD 26, and is mainly provided with the video signal processing circuit 12. Further, the HDMI terminal 12a is mounted in the upper right of the board, with its connector oriented rightward, and the tuner is disposed in the lower right of the board, with its connector oriented rightward. Furthermore, an LVDS terminal 12b to which an LVDS cable is connected is disposed at the upper edge, and a drive signal based on a video signal processed by the video signal processing circuit 12 is outputted to the LCD 26 through the LVDS terminal 12b.

The digital board A performs digital processing and is formed of a multilayer board. That is, digital signals are highly resistant to noise, and the surface layer of the multilayer board is a ground to shield internal noise and be resistant to external noise. Therefore, even if the digital board A is disposed adjacent to the inverter board D which processes high-frequency waves and therefore is likely to be a noise source and the analog board C which has the power supply circuit mounted thereon and therefore is also likely to be a noise source, a problem in signal processing hardly occurs.

Since there are adopted different television broadcast systems (NTSC, PAL, SECAM, etc.) for different destinations (Japan, Europe, US, etc.), the video signal processing circuit 12 has different circuit configurations for different destinations. In this embodiment, the video signal processing circuit 12 is formed on an independent board as the digital board A; therefore, a product for a different destination can be manufactured adaptively by replacing the digital board A. Thus, a design change for each destination can be achieved by redesigning only the digital board A, which can increase the efficiency of development and shorten the delivery time of a product.

The jack board B is provided with the input and output circuit 14, and is disposed on the right side of the digital board A, that is, in the upper right of the back of the LCD 26. Composite terminals 14a are disposed on the jack board B, with the connectors oriented upright relative to the board, that is, backward relative to the liquid crystal television 100. The jack board B is connected to the digital board A via a predetermined cable to input and output an audio and video signal and a control signal. Since the jack board B hardly emits noise and its circuit configuration is not complicated, the jack board B is formed of a single-layer board.

In the jack board B as well, a terminal for inputting and outputting a signal has different shapes for different destinations; therefore, the input and output circuit 14 needs to have different circuit configurations for different destinations. In this embodiment, the input and output circuit 14 is formed on an independent board as the jack board B; therefore, a product for a different destination can be manufactured adaptively by replacing the jack board B. Thus, a design change for each destination can be achieved by redesigning only the jack board B, which can increase the efficiency of development and shorten the delivery time of a product. The reason why the video signal processing circuit 12 and the input and output circuit 14 are formed on different boards is that the digital board A is a multilayer board whereas the jack board B is a single-layer board. That is, if a multilayer board is used for both of the video signal processing circuit 12 and the input and output circuit 14, there is possible internal noise from the video signal processing circuit 12 to the input and output circuit 14 and the multilayer board brings about an increase in cost. If a single-layer board is used for both of the video signal processing circuit 12 and the input and output circuit 14, the video signal processing circuit 12 needs to be subjected to noise suppression such as shielding. Therefore, the boards are separated.

The analog board C is provided with the audio signal processing circuit 16 and the power supply circuit 20, and is disposed adjacent to and under the digital board A, that is, in the lower center of the back of the LCD 26. The analog board C is connected to the digital board A, and an audio signal is inputted from the digital board A. The analog board C is also connected to the inverter board D, and a DC voltage is supplied from the rectifier circuit disposed on the inverter board D. Based on the DC voltage, the power supply circuit generates various voltages and supplies them to the circuits of the analog board C, the digital board A, and the jack board B.

The inverter board D is provided with the inverter circuit 24 and the rectifier circuit 22. The inverter board D is disposed in a vertically oriented shape in the left of the back of the LCD 26 and is adjacent to the analog board C. As a matter of course, the inverter board D may be disposed in the right if the jack board B is disposed in the left. The AC power cable 22a connected to the rectifier circuit 22 is connected to the lower end of the inverter board D. That is, the rectifier circuit 22 is formed in the lower end of the inverter board D. In the inverter board D, an AC voltage inputted via the AC power cable 22a is rectified by the rectifier circuit 22 to a DC voltage, which is supplied to the inverter circuit 24. The inverter circuit 24 generates a high-frequency AC voltage from the input DC voltage, and causes AC current to flow into the backlight of the LCD 26 via an inverter harness (not shown) so as to light the backlight.

As shown in FIG. 3, connectors are exposed from the boards A to D disposed on the back of the liquid crystal television 100. That is, the back cabinet of the liquid crystal television 100 is formed such that the center portion in the lateral direction projects backward while the back cabinet houses the boards and the LCD 26. A tuner terminal and the HDMI terminal 12a disposed on the digital board A are exposed rightward from a right-side step portion formed by the projection. This enables the tuner and the HDMI to be connected from the outside of the cabinet. In the upper right of the back, the input and output terminals of the jack board are exposed for connections from the outside of the cabinet. The AC power cable 22a connected to the lower end of the inverter board D is extended out from the lower left of the back of the cabinet.

That is, the inverter board D which processes high-frequency waves and therefore is likely to be a noise source is disposed in the left, the jack board B which is susceptible to noise is disposed in the right, and the digital board A which is resistant to noise is disposed therebetween. Further, the analog board provided with the weighty power supply circuit 20 is disposed under the centered digital board so as not to disturb the weight balance of the product. The analog board C provided with the power supply circuit which is the next most likely to be a noise source after the inverter circuit is disposed so as not to be adjacent to the jack board B. Since the power supply circuit is disposed in the lower part of the analog board C, the jack board B is less susceptible to noise caused by the power supply circuit.

(4) Board Layout of Plasma Television

Figure 4:
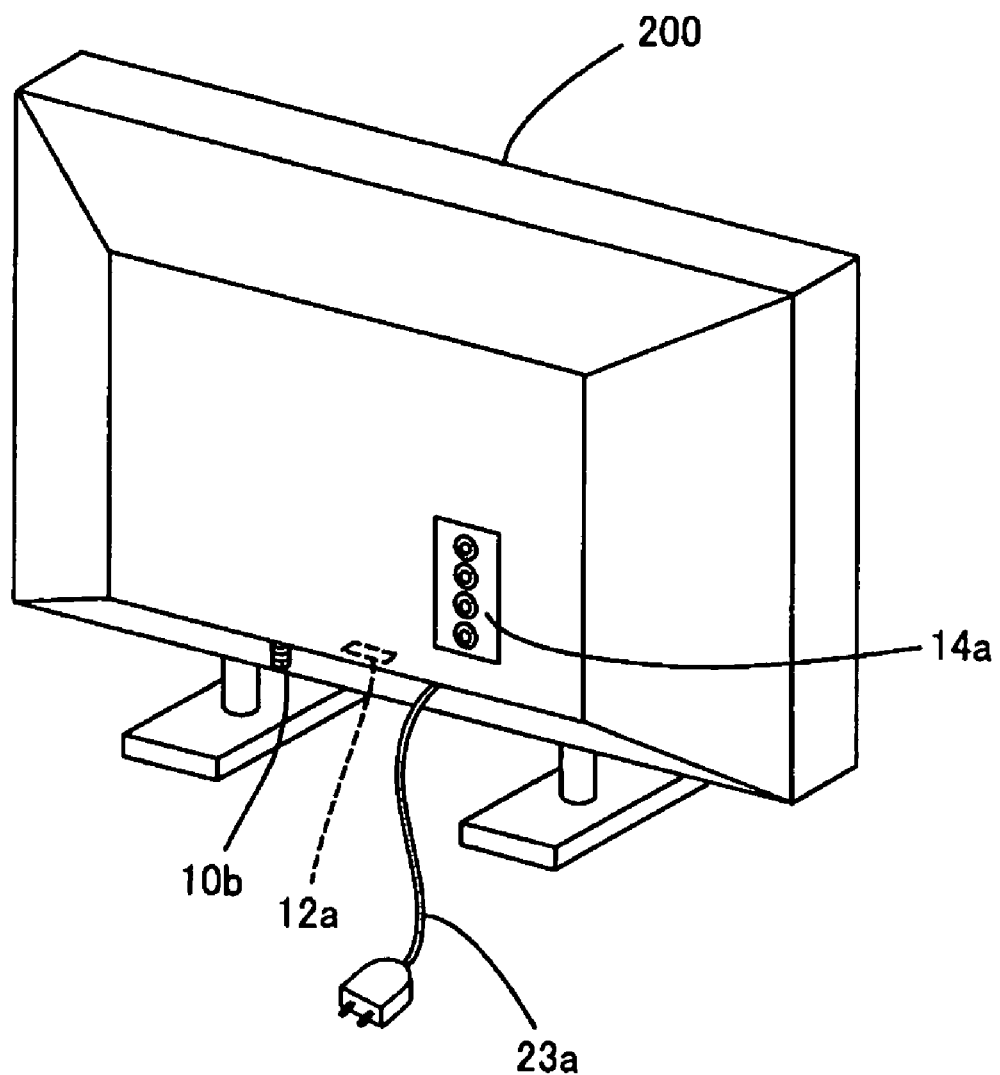
FIG. 4 is an exemplarily illustration of a perspective rear view of the plasma television.
Figure 6:
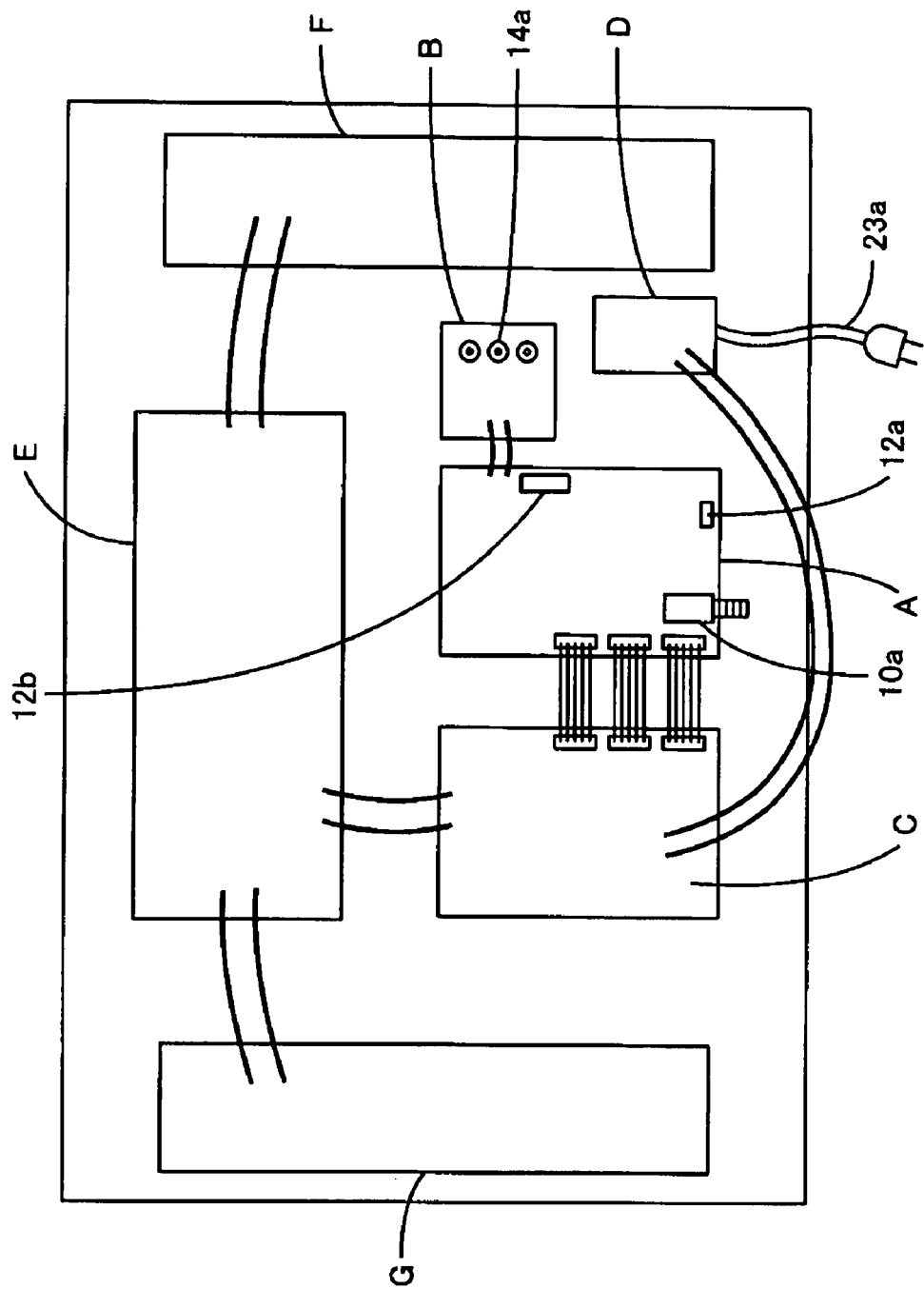
FIG. 6 is an exemplarily illustration of a schematic view showing board layout inside the back of the plasma television.

Hereinafter, the board layout of the plasma television 200 will be described with reference to FIGS. 4 and 6. FIG. 4 is a perspective rear view of the plasma television 200. FIG. 6 is a schematic view showing the board layout inside the back of the plasma television 200.

In FIG. 6, the outer frame indicates the outline of the back of the PDP 34 inside the plasma television 200. There are disposed, on the back of the PDP 34, the digital board A (first board), the jack board B (second board), the analog board C (third board), a rectifier board D' (fourth board, rectifier board), a main power supply board E, a sustain power supply board F, and a scan power supply board G. Circuits mounted on the digital board A, the jack board B, and the analog board C are the same as those of the liquid crystal television 100. Hereinafter, the position relationship among the boards, and the circuits mounted on the boards other than the digital board A, the jack board B, and the analog board C will be described.

On the back of the PDP 34, the main power supply board E, the sustain power supply board F, and the scan power supply board G are disposed as an essential configuration of the plasma television 200. The main voltage generating circuit 28 is formed on the main power supply board E, the sustain voltage generating circuit 32 is formed on the sustain power supply board F, and the scan voltage generating circuit 30 is formed on the scan power supply board G. The main power supply board E is disposed in a horizontally oriented shape in the upper end of the back of the PDP 34, the sustain power supply board F is disposed in a vertically oriented shape in the right end, and the scan power supply board G is disposed in a vertically oriented shape in the left end. That is, according to this structure, a board other than the boards E, F, and G cannot be disposed in the upper end and both the left and right ends.

The digital board A and the analog board C are disposed side by side in the lower center of the back of the PDP 34. The position relationship between the digital board A and the analog board C of the PDP 34 is obtained by turning these boards of the liquid crystal television 100 about 90° clockwise while substantially maintaining the relative position relationship therebetween.

This position relationship advantageously enables the digital board and the analog board to be connected as in the case of the liquid crystal television 100. In other words, the digital board A and the analog board C are disposed in the lower center of the back of the PDP 34, in which the digital board A is located on the right side and the analog board C is located on the left side. With this layout, the connectors of the tuner 10 and the HDMI terminal 12a are oriented downward.

The jack board B is disposed between the sustain power supply board F and the digital board A. This interposes the digital board A between the jack board B and the power supply circuit 20, so that the jack board B is less susceptible to noise from the power supply circuit 20.

Figure 7:
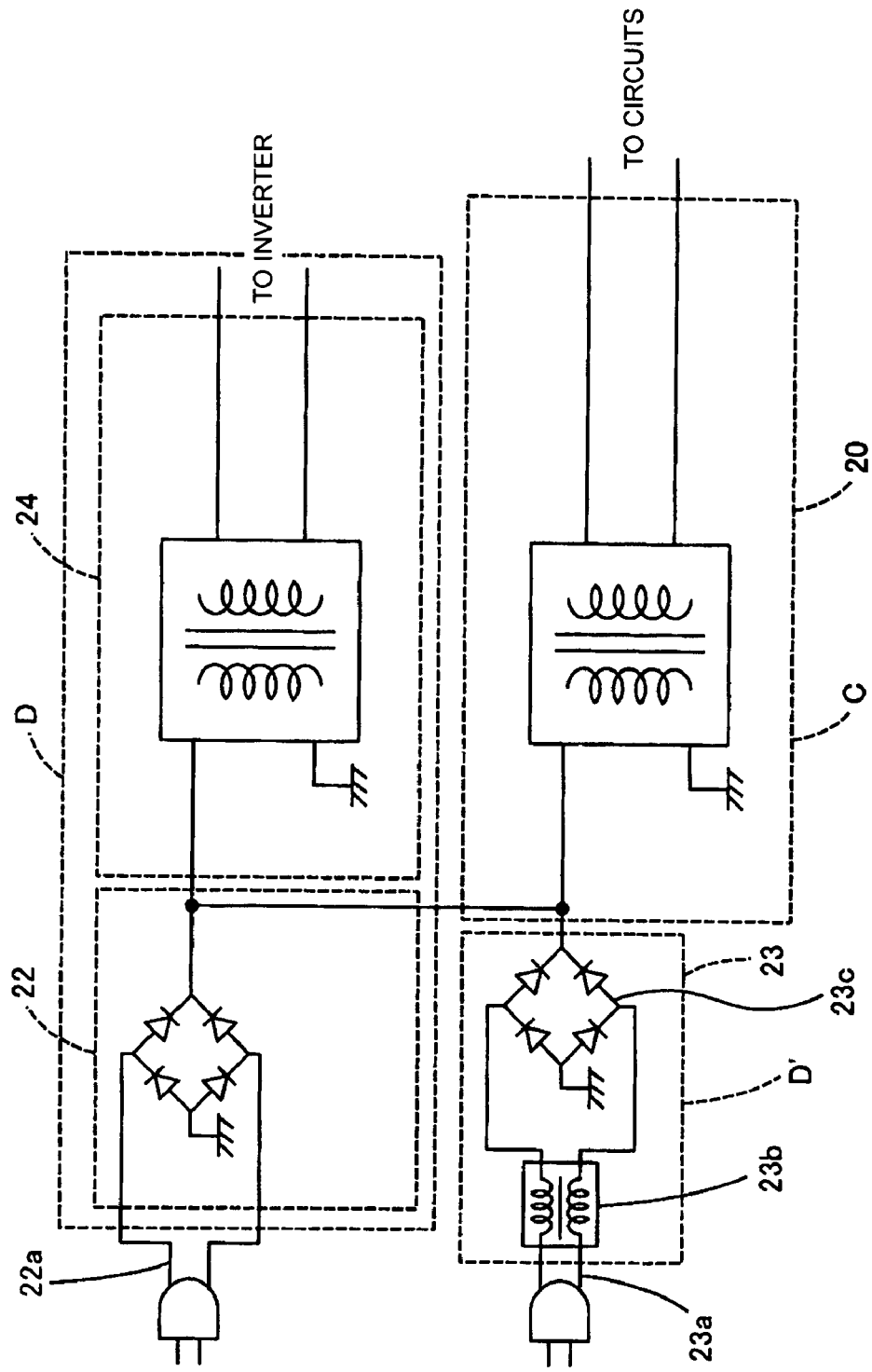
FIG. 7 is an exemplarily illustration of a schematic block diagram of circuits related to a power supply.

The rectifier board D' is provided with only the rectifier circuit 23. The relationship among the power supply circuit, the rectifier circuit, and the inverter circuit will be described with reference to FIG. 7. FIG. 7 is a schematic block diagram of circuits related to the power supply, showing the inverter circuit 24, the rectifier circuit 22, the rectifier circuit 23, and the power supply circuit 20.

In FIG. 7, the inverter circuit 24 and the rectifier circuit 22 are formed on the inverter board D, and the power supply circuit 20 which is supplied with a DC voltage from the rectifier circuit 22 is formed on the analog board C. That is, the rectifier circuit 22 and the power supply circuit 20 are formed on different boards, and connected to each other via a cable. On the other hand, the rectifier circuit 23 is formed on the rectifier board D'. That is, the inverter board D is mounted only in the liquid crystal television 100, the rectifier board D' is mounted only in the plasma television 200, and the power supply circuit 20 formed on the analog board C is mounted both in the liquid crystal television 100 and in the plasma television 200. The power supply circuit 20 is supplied with a voltage from the rectifier circuit 22 when mounted in the liquid crystal television 100, and from the rectifier circuit 23 when mounted in the plasma television 200. In the rectifier circuit 23, a line filter 23b may be disposed in the preceding stage of a rectifying device 23c so as to reduce noise affecting the power supply circuit 20.

As shown in FIG. 4, connectors are exposed from the boards A to C, D', and E to F disposed on the back of the plasma television 200. That is, the tuner terminal 10a and the HDMI terminal 12a disposed on the digital board A are exposed downward from the lower end of the back cabinet of the plasma television 200. This enables the tuner and the HDMI terminal to be connected from the outside of the cabinet. Substantially between the center and the right end of the back, the input and output terminals of the jack board are exposed for connections from the outside of the cabinet. The AC power cable 23a connected to the lower end of the rectifier board D' is extended out from the lower right of the cabinet.

(5) Summary

That is, in the liquid crystal television 100, the video signal processing circuit 12 is formed on the digital board A, the input and output circuit 14 is formed on the jack board B, the audio signal processing circuit 16 and the power supply circuit 20 are formed on the analog board C, and the rectifier circuit 22 and the inverter circuit 24 are formed on the inverter board D. Further, on the back of the LCD 26, the inverter board D is disposed in a vertically oriented shape in the left, the analog board C is disposed in the lower center, the digital board A is disposed in the upper center adjacent to the analog board C, and the jack board B is disposed in the upper right.

In the plasma television 200, the video signal processing circuit 12 is formed on the digital board A, the input and output circuit 14 is formed on the jack board B, the audio signal processing circuit 16 and the power supply circuit 20 are formed on the analog board C, and the rectifier circuit 23 is formed on the rectifier board D'. Further, on the back of the PDP 34, the digital board A and the analog board C are disposed side by side in the lower center where the digital board A is located on the right side and the analog board C is located on the left side, the jack board B is disposed on the right side of the digital board A, slightly toward the top, and the rectifier board D' is disposed on the right side of the digital board A, slightly toward the bottom.

Thus, it is possible to provide a liquid crystal panel, a plasma display panel, and a liquid crystal television that can adapt to various destinations in view of the difference of circuit configurations between the liquid crystal television and the plasma television and are resistant to noise.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A wide-screen liquid crystal television with at least 20-inch screen, in which there are formed, on boards, a tuner that receives a digital broadcast and outputs a digital video signal;
an High-Definition Multimedia Interface (HDMI) terminal through which a digital audio and video signal is input and output;
a rectifier circuit that rectifies an Alternative Current (AC) voltage inputted via an AC power cable to generate a Direct Current (DC) voltage;
a power supply circuit that is supplied with a DC voltage from the rectifier circuit and generates various voltages;
an analog circuit that performs analog processing on an input video signal and an input audio signal;
a digital circuit that performs digital processing on a video signal input from one of the tuner and the HDMI terminal;
an Low Voltage Differential Signaling (LVDS) terminal for outputting a liquid crystal panel driving signal for driving a liquid crystal panel via an LVDS cable from the digital circuit;
an input and output circuit having an input and output terminal for inputting and outputting audio and video, connected to an external device; and
an inverter circuit that is supplied with a DC voltage from the rectifier circuit and supplies an AC voltage to a backlight of the liquid crystal panel,
the wide-screen liquid crystal television, including the liquid crystal panel that displays video on a screen in accordance with the panel driving signal and a cabinet that exposes the screen of the liquid crystal panel while housing the boards and the liquid crystal panel, with the boards disposed on the back of the liquid crystal panel,
the wide-screen liquid crystal television, comprising:
a first board on which the tuner, the HDMI terminal, and the LVDS terminal are disposed and the digital circuit is formed;
a second board on which the input and output circuit is formed;
a third board on which the analog circuit and the power supply circuit are formed; and
a fourth board on which the rectifier circuit and the inverter circuit are formed;
the first board, the second board, and the third board are identical to respective boards used in a plasma display panel,
the fourth board is disposed in a vertically oriented position in the left,
the third board is disposed in the lower center and the first board is disposed in the upper center adjacent to the third board while maintaining a position relationship between the third board and the first board when disposed on the back of the plasma display panel,
the second board is disposed in the right, interposing the first board between the fourth board and the second board, and
the cabinet is formed such that a center portion in a lateral direction projects backward, a terminal of the tuner and the HDMI terminal are exposed rightward from a right-side step portion formed by the projection, the input and output terminal is exposed in the upper right of the back of the cabinet, and the AC power cable is extended out from the lower left of the back of the cabinet.

2. A liquid crystal panel in which there are formed, on boards, a rectifier circuit that rectifies an input Alternative Current (AC) voltage to generate a Direct Current (DC) voltage; a power supply circuit that is supplied with a DC voltage from the rectifier circuit and generates various voltages; an analog circuit that performs analog processing on an input video signal and an input audio signal; a digital circuit that performs digital processing on an input video signal; an input and output circuit having an input and output terminal for inputting and outputting audio and video, connected to an external device; and an inverter circuit that is supplied with a DC voltage from the rectifier circuit and supplies an AC voltage to a backlight of the liquid crystal panel, the boards being disposed on a back of the liquid crystal panel,
the liquid crystal panel, comprising:
a first board on which the digital circuit is formed;
a second board on which the input and output circuit is formed;
a third board on which the analog circuit and the power supply circuit are formed; and
a fourth board on which the rectifier circuit is formed;
the first to fourth boards are identical to respective boards used in a plasma display panel,
the fourth board is disposed in the lower end of one of a left side or the right side of an inverter board on which the inverter circuit is formed is disposed in a vertically oriented position above the rectifier circuit, the third board is disposed in the lower center and the first board is disposed in the upper center adjacent to the third board while maintaining a position relationship between the third board and the first board when disposed on the back of the plasma display panel, and the second board is disposed on a side interposing the first board between the fourth board and the second board.

3. The liquid crystal panel according to claim 2, wherein the fourth board and the inverter board are formed on the same board.

4. The liquid crystal panel according to claim 2, wherein a design change is made on only a board necessary to be changed for each destination out of the first to fourth boards.

5. A plasma display panel in which there are formed, on boards, a rectifier circuit that rectifies an input Alternative Current (AC) voltage to generate a Direct Current (DC) voltage; a power supply circuit that is supplied with a DC voltage from the rectifier circuit and generates various voltages; an analog circuit that performs analog processing on an input video signal and an input audio signal; a digital circuit that performs digital processing on an input video signal; and an input and output circuit having an input and output terminal for inputting and outputting audio and video, connected to an external device, the boards being disposed on the back of the plasma display panel, the plasma display panel, comprising:
a first board on which the digital circuit is formed;
a second board on which the input and output circuit is formed;
a third board on which the analog circuit and the power supply circuit are formed; and
a fourth board on which the rectifier circuit is formed;
the first to fourth boards are identical to respective boards used in a liquid crystal panel,
the first board and the third board are disposed next to each other in the lower center while maintaining a position relationship between the first board and the third board when disposed on the back of the plasma display panel, the second board is disposed on one of the left side and the right side of the first board so as not to be adjacent to the third board, and the fourth board is disposed on one of the left side or the right side of the first board and the third board.

6. The plasma display panel according to claim 5, wherein the first board and the third board are disposed side by side while maintaining a relative position relationship between the first board and the third board when disposed on the back of the liquid crystal panel.

7. The plasma display panel according to claim 5, wherein the rectifier circuit is provided with a line filter in a preceding stage.

8. The plasma display panel according to claim 5, wherein the rectifier circuit supplies a voltage to a main voltage generating circuit which generates a voltage for generating a sustain voltage and a scan voltage, the plasma display panel includes a sustain power supply board on which a circuit for generating the sustain voltage is formed, a scan power supply board on which a circuit for generating the scan voltage is formed, and a main power supply board on which the main voltage generating circuit is formed, the main power supply board is disposed in a horizontally oriented shape above the first to fourth boards, the sustain power supply board is disposed in a vertically oriented shape above to the right of the first to fourth boards, and the scan power supply board is disposed in a vertically oriented shape above to the left of the first to fourth boards.

* * * * *